April 8, 1969
J. M. EITEL
3,437,175
LIFTING EQUIPMENT
Filed Jan. 15, 1968
Sheet 1 of 9
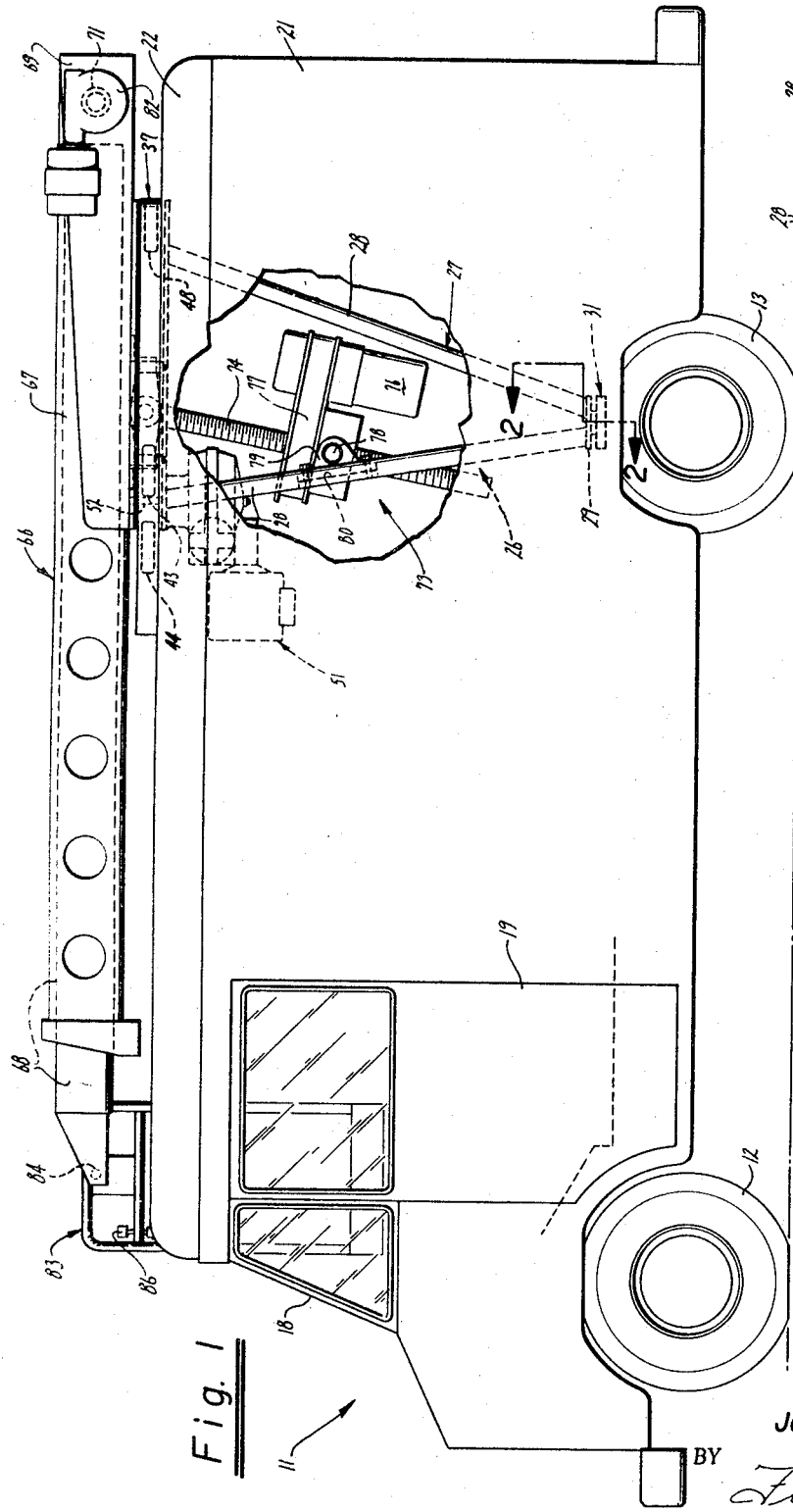
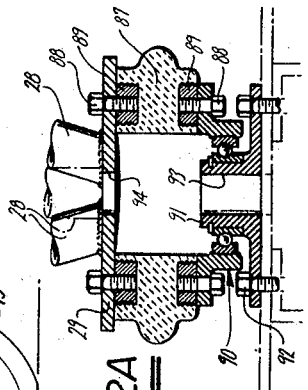
Fig. 2A
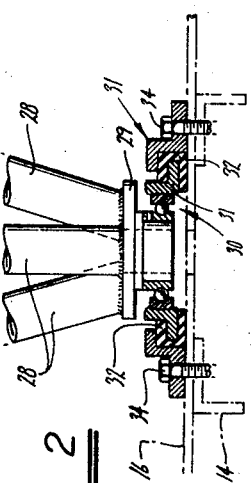
Fig. 2
Fig. 1
INVENTOR.
Jay M. Eitel
BY
Attorneys April 8, 1969

J. M. EITEL 3,437,175

LIFTING EQUIPMENT

Filed Jan. 15, 1968

INVENTOR.
Jay M. Eitel
BY
Attorneys

INVENTOR.
Jay M. Eitel

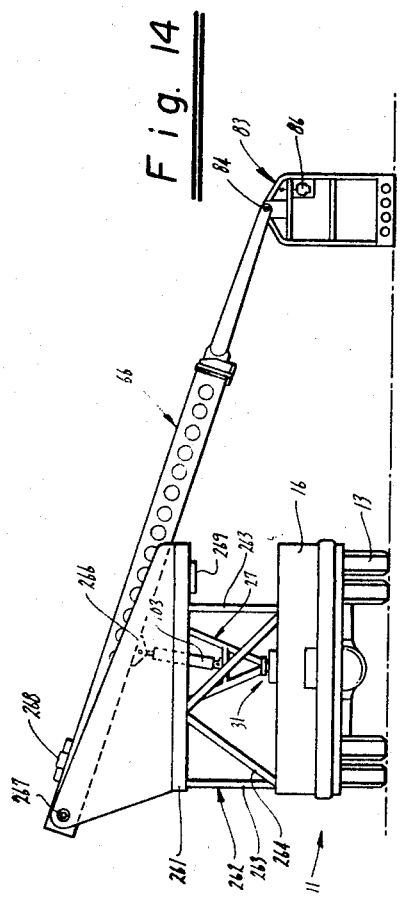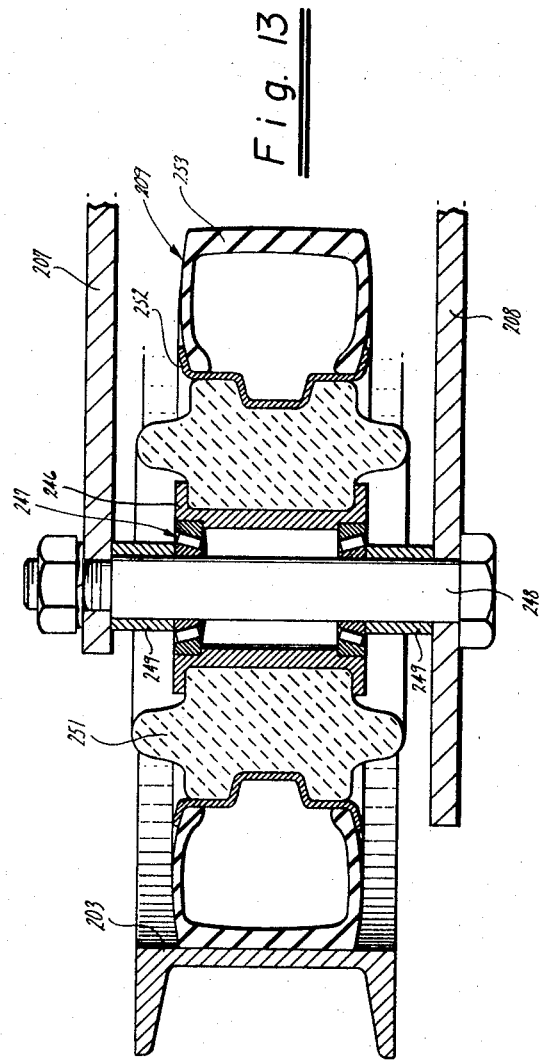

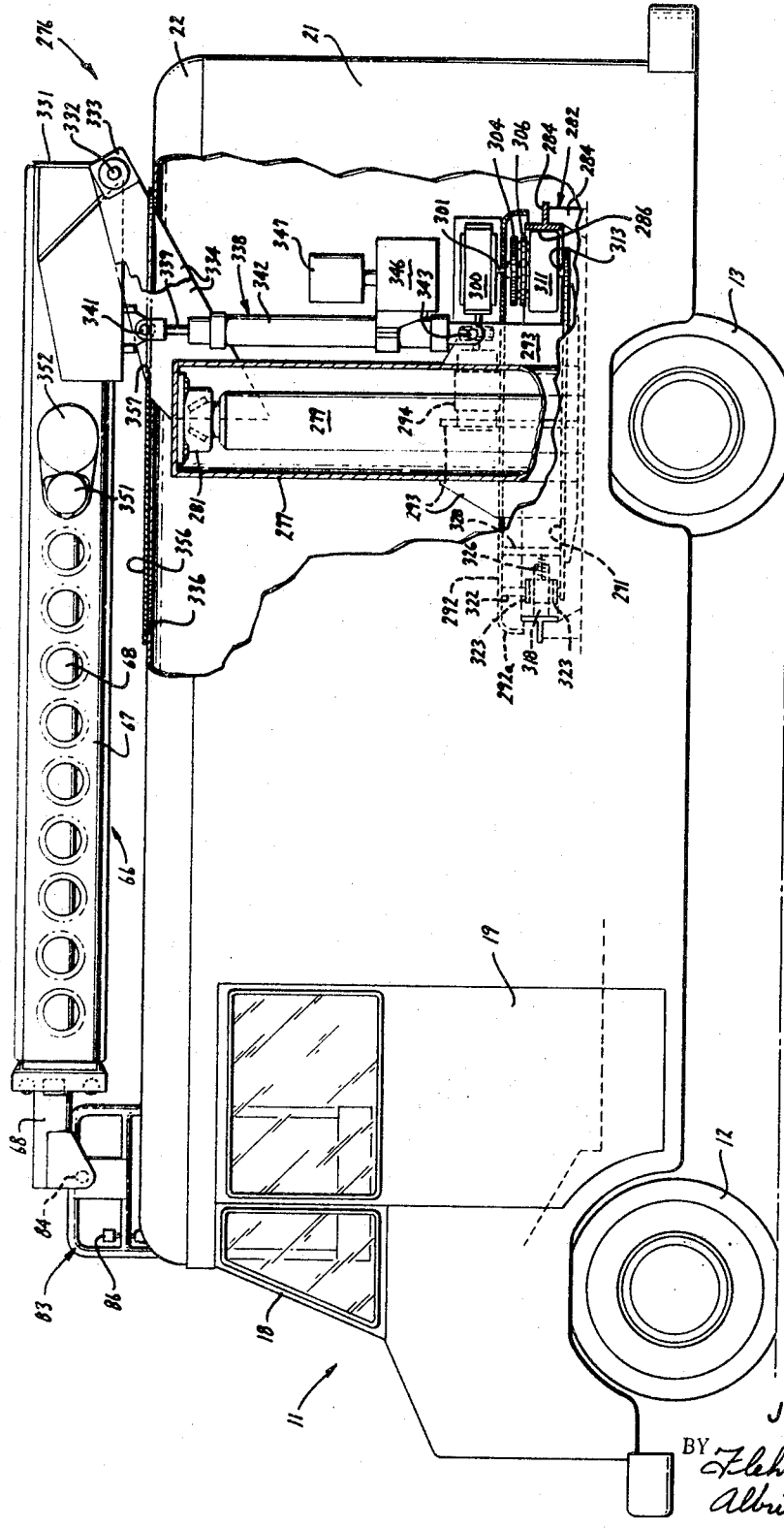

April 8, 1969

J. M. EITEL 3,437,175

LIFTING EQUIPMENT

Filed Jan. 15, 1968

INVENTOR.
Jay M. Eitel

BY Flehr, Hohbach, Test,
Albritton & Herbert
Attorneys

United States Patent Office 3,437,175
Patented Apr. 8, 1969

3,437,175
LIFTING EQUIPMENT
Jay M. Eitel, Atherton, Calif., assignor to Telsta Corporation, San Carlos, Calif., a corporation of California
Continuation-in-part of application Ser. No. 521,193, Jan. 17, 1966. This application Jan. 15, 1968, Ser. No. 697,887
Int. Cl. A62b 3/00; E04g 1/15, 1/18
U.S. Cl. 182—46     28 Claims

ABSTRACT OF THE DISCLOSURE

Lifting equipment having a rotatable boom structure with means for rotating the boom structure including a stationary track structure with a circular driving surface and at least one wheel-like driven member engaging the surface.

*Cross-reference to related application*

This application is a continuation-in-part of application Ser. No. 521,193, filed Jan. 17, 1966, now abandoned.

*Background of the invention*

Heretofore, many different types of lifting equipments have been provided. Certain of the lifting equipments have been provided with means for rotating the lift supporting structure. Conventionally, such means often takes the form of a large gear and a small pinion which has been very expensive and subject to wear. In addition, the overall construction of such lifting equipment has been unduly complicated and expensive, therefore, limiting its use. There is, therefore, a need for a new and improved lifting equipment which overcomes the above named disadvantages.

*Summary of the invention and objects*

The lifting equipment comprises a platform with a support structure rotatably mounted upon the platform for rotation about a vertical axis. A boom structure is mounted upon the support structure for movement about a substantially horizontal axis. The boom structure has an outer end which is movable to a position laterally spaced from the support structure. A framework is mounted in a fixed position on the platform and generally encircles the support structure. The framework has a non-rotatable circular drive surface mounted in a fixed position relative to the platform. Drive means is carried by the support structure and engages the drive surface. Motive means is provided for driving the drive member for rotating the support structure.

In general, it is an object of the present invention to provide a lifting equipment in which particularly unique means is provided for rotating the support structure which carries the boom structure.

Another object of the invention is to provide a lifting equipment of the above character which can be mounted upon substntially conventional vehicles.

Another object of the invention is to provide a lifting equipment of the above character in which friction type drive means is provided for rotating the boom structure.

Another object of the invention is to provide a lifting equipment of the above character which is very economical to manufacture.

Another object of the invention is to provide a lifting equipment of the above character which can be readily incorporated into the body of conventional vehicles.

Another object of the invention is to provide a lifting equipment of the above character in which insulation from high and low voltages can be readily provided.

Another object of the invention is to provide a lifting equipment of the above character which can be utilized with various types of boom structures.

Another object of the invention is to provide a lifting equipment of the above character in which the drive means has a relatively large reduction ratio to thereby reduce the requirement of the speed reduction gearing for the lifting equipment.

Another object of the invention is to provide a lifting equipment of the above character in which machine work, large gears, heavy bearings and the like have been greatly reduced or eliminated.

Another object of the invention is to provide a lifting equipment of the above character in which the driving force of the drive means can be readily controlled.

Another object of the invention is to provide a lifting equipment of the above character which will automatically release when an obstruction is encountered.

Another object of the invention is to provide a lifting equipment of the above character in which the rotational forces can be readily adjusted.

Another object of the invention is to provide a lifting equipment of the above character in which the workman's platform can be lowered to the ground.

Additional objects and features of the invention will appear from the following description in which the preferred embodiment is set forth in detail in conjunction with the accompanying drawings.

*Brief description of the drawings*

FIGURE 1 is a side elevational view of a lifting equipment incorporating the present invention.

FIGURE 2 is a cross-sectional view taken along the line 2—2 of FIGURE 1.

FIGURE 2A is an enlarged cross-sectional view of an alternative construction to that shown in FIGURE 2.

FIGURE 13 is an enlarged cross-sectional view taken along the line 13—13 of FIGURE 11.

FIGURE 14 is an end elevational view of still another embodiment of a lifting equipment incorporating the present invention.

FIGURE 15 is a side elevational view of still another embodiment of the lifting equipment incorporating the present invention.

Description of the preferred embodiments

Figure 3:
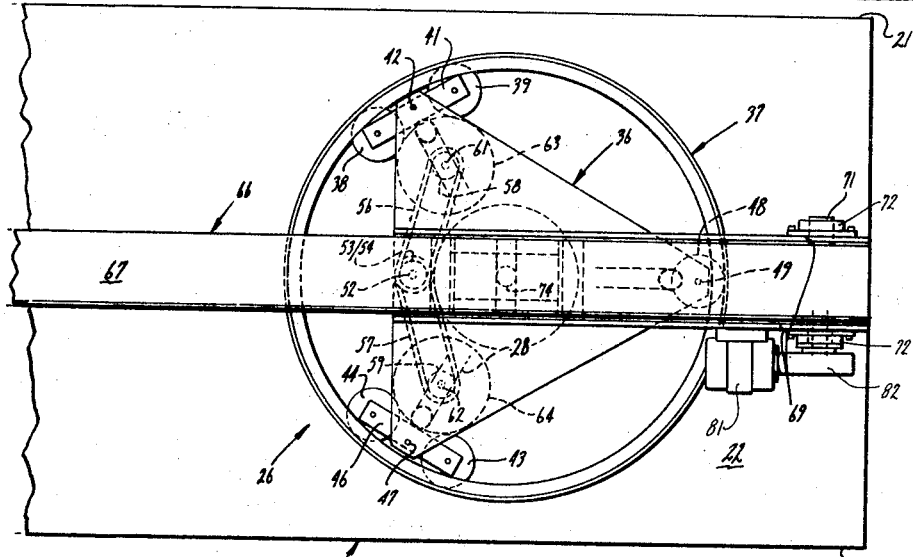
FIGURE 3 is a partial top plan view of the lifting equipment shown in FIGURE 1.

As shown in FIGURES 1–4 of the drawing, the lifting equipment comprises a self-propelled vehicle 11 having front and rear wheels 12 and 13 rotatably mounted upon a chassis or framework 14. The self-propelled vehicle 11 is provided with suitable motive means (not shown) for supplying power to the wheels of the vehicle. A platform or bed 16 is provided upon the chassis or framework 14. A large box-like or van-type body 17 is mounted upon the chassis 14. The body 17 is formed to provide a driving station for the self-propelled vehicle and is provided with a front windshield 18 for the driver of the vehicle. The body 17 is provided with a side entrance door 19 whereby the operator may enter the driving station of the vehicle. As can be seen particularly from FIGURES 1 and 4, the body 17 extends to the rear to provide a van-like enclosure formed by spaced parallel side walls 21, a top wall 22 and a rear wall (not shown). The bottom side of the van-like enclosure is formed by the platform 16. The front end of the body is provided with the rectangular space 23 to receive the workman's basket as hereinafter described so that it is positioned alongside the station whereby the driver may readily enter and leave the workman's basket with respect to the driving station without dismounting from the vehicle. This space 23 is, therefore, preferably accessible from the driving station either by a door (not shown) provided in the body or by leaving an opening in the body to permit ingress and egress from the space 23.

Figure 4:
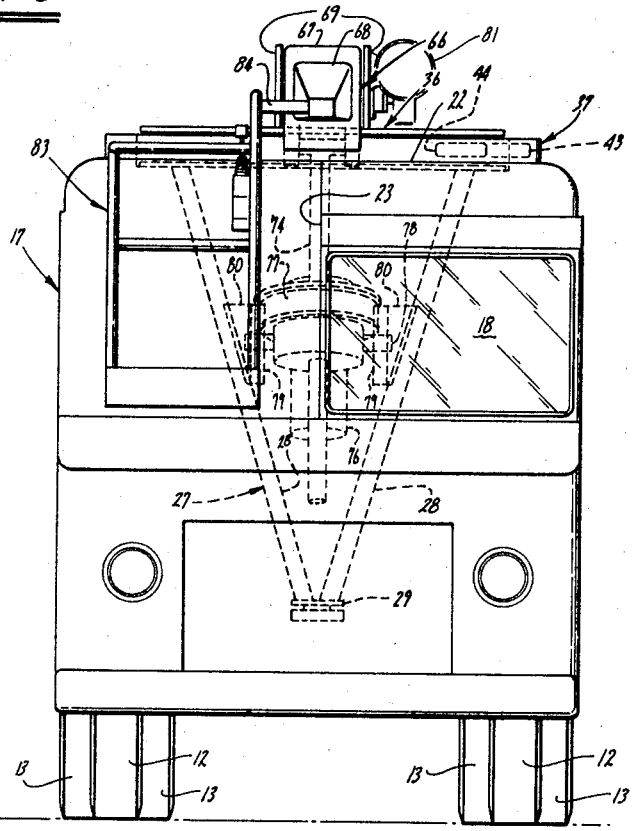
FIGURE 4 is a front elevational view of the lifting equipment shown in FIGURE 1.

A lifting apparatus 26 is mounted on the self-propelled vehicle 11. The lifting apparatus 26 consists of a support structure 27. The support structure 27 as shown in FIGURE 4, is in the form of an inverted cone formed by at least three support members 28 arranged in the form of a three-sided pyramid. The lower extremities of the support members 28 are secured to a mounting plate 29 by suitable means such as welding (see FIGURE 2). Means is provided for rotatably mounting the support structure 27 for rotational movement about a vertical axis and it consists of a self-aligning ball bearing assembly 30 with a flanged pillow block 31. The flanged pillow block 31 is mounted within a member 32 formed of a suitable insulating material such as rubber. It is preferable that the insulating member 32 be able to withstand common secondary voltages encountered in power distribution systems as, for example, voltages ranging from 110 to 600 volts. The insulating member 32 is held in a horizontal position by a flanged collar 33 secured to the platform 16 of the vehicle by suitable means such as the cap screws 34 extending into the frame 14.

The upper extremities of the support members 28 are secured to a triangular plate assembly 36 by suitable means such as welding. Means is provided for mounting the plate assembly 36 in a circular track structure 37 and consists of at least three friction members which are mounted upon the plate. The friction members can take any suitable form as, for example, as shown in FIGURE 3, they can consist of wheel-like members in the form of a first pair of rollers 38 and 39 which are mounted on opposite ends of bracket 41 pivotally mounted upon the plate 36 by a pin 42; and a second pair of rollers 43 and 44 similarly mounted upon a bracket 46 pivotally mounted upon the plate 36 by a pin 47. Alternatively, if desired, at least one of the friction members can be in the form of a slidable shoe (not shown).

It will be noted from FIGURE 3 that the first and second sets of rollers are spaced approximately 120° apart on two of the apexes of the isosceles triangle formed by the plate assembly 36. In addition, a roller 48 is pivotally mounted upon a pin 49 which is spaced 120° from the first and second roller assemblies.

The rollers 38 and 39, 43 and 44 and 48 travel in the circular track structure 37 which is substantially U-shaped in cross-section and has a width which can accommodate the rollers. The circular track structure 37 is mounted on the roof or top wall 22 of the body 17 and is supported thereby. If desired, additional reinforcing can be provided in the body 17 to provide adequate support for the circular track structure 37.

Means is provided for causing relative movement between the circular track structure 37 and the plate 36 and consists of means for driving at least one of the friction members. As shown in FIGURE 3, such means consists of a gear motor assembly 51 which is mounted on the bottom side of the plate assembly 36 and which has an output shaft 52 which drives a pair of sprockets 53 and 54 mounted thereon. The sprockets 53 and 54 drive chains 56 and 57 which drive sprockets 58 and 59. The sprockets 58 and 59 are mounted on shafts 61 and 62 rotatably mounted in the plate assembly 36. Resilient wheels 63 and 64 of a suitable type as, for example, pneumatic tired wheels, are mounted upon shafts 61 and 62 and are driven thereby. As can be seen from FIGURE 3, the wheels 63 and 64 are positioned so that they frictionally engage the rollers 38 and 39 and the rollers 43 and 44 so that as the rubber tired wheels 63 and 64 are driven, the rollers 38, 39 and 43, 44 will be driven to cause the plate assembly 36 to rotate relative to the circular track structure 37. The rollers 38, 39 and 43, 44 and 48 can be formed of any desired material. However, in certain applications, it may be desirable to form the same of an insulating material as, for example, hard rubber.

The lifting apparatus 26 also includes a boom structure 66 which is mounted upon the plate assembly 36 which serves as a turntable. The boom structure 66 is comprised of a main or outer section 67 and a telescoping or inner section 68. The outer or main section 67 is pivotally mounted upon a U-shaped member 69 by hollow tubes 71 which are affixed to opposite sides of the main section and are pivotally mounted in pillow blocks 72 secured to the member 69 which forms a horizontal axis about which the boom structure swings. The U-shaped member 69 is secured to the plate 36 by suitable means such as welding. If desired, the telescoping section 68 can be formed with insulating material in the manner described in U.S. Letters Patent 3,136,385.

Means is provided for raising and lowering the outer free end of the boom structure 66; or in other words, for swinging the boom structure 66 about the horizontal axis provided by the hollow tubes or trunnions 71. Such means can take any suitable form as, for example, the ball screw jack assembly 73 of the type described in United States Letters Patent 3,204,720, issued Sept. 7, 1965. As described therein, the ball screw jack assembly 73 consists of a screw 74 which is pivotally connected to the outer or main boom section 67. A nut (not shown) receives the screw 74 and is driven by a motor 76 through a gear box 77. The gear box 77 is provided with trunnions 78 mounted in pillow blocks 79 carried by a bracket 80 supported by the support members 28.

Means is provided for extending and retracting the telescoping boom structure 66 and also can take any suitable form as, for example, described in Patent 2,896,750 issued July 28, 1959. It includes a combination motor and brake 81 which is controlled for extending and retracting the inner boom section 68 with respect to the outer boom section 67. The motor 81 drives a worm (not shown) which drives a worm gear (not shown) provided in a gear box 82. The worm drives a shaft extending through the hollow tube 71 which has a sprocket (not shown) mounted thereon that drives the chain (not shown) for extending and retracting the boom structure. Alternatively, where the inner boom section 68 is formed with an insulating material, the means for extending and retracting the boom structure can take the form disclosed in Patent 3,136,385.

A workman's or operator's platform 83 is mounted on the outer end of the boom structure and, as shown in FIGURES 1 and 4, is pivotally mounted upon a pin 84 carried by the outer end of the inner boom section 68. The pivotal mounting permits the workman's platform 83 to assume a level condition as the boom structure is raised and lowered about the horizontal axis provided by the tubes 71.

Control means is provided for controlling the operation of the boom structure 66 either from the workman's basket or the platform 83, or from the vehicle itself. Such control means is described in Patent 3,136,385, and as disclosed, may include a control mechanism 86 which is mounted within the basket 83 and which can be operated to control the operation of the boom structure.

Operation and use of the lifting equipment, as shown in FIGURES 1–4, may now be briefly described as follows. Let it be assumed that the lifting equipment is to be utilized in much the same manner as the vehicle and lift construction in Patent No. 2,938,594 and that it is particularly desirable to use it for a one-man operation. In such a case, the operator in the driving station advances the vehicle 11 to the desired location. He then steps from the operator's driving station to the workman's basket 83 without dismounting from the vehicle and engages the control mechanism 86 to operate the lifting apparatus 26 to locate the workman's platform or basket 83 in the desired location. As described in Patent No. 3,136,385, the control mechanism 86 can be operated to individually or simultaneously operate the means for moving the outer end of the boom structure 66 about a vertical axis, raising and lowering the same about a horizontal axis and for moving the same toward and away from the vehicle by extending and retracting the telescoping boom structure 66. The rotation in a clockwise or counter-clockwise direction can be accomplished by operating the gear motor 51, whereas the raising and lowering about the horizontal axis 71 can be accomplished by operating the motor 76 and extending and retracting of the boom structure 66 can be accomplished in the gear motor 81. Thus, the operator can readily position the workman's basket in the desired location. After the operator has completed his work, the workman's basket 83 can be again lowered into position alongside the driving station, as shown in FIGURE 4, after which the operator can step out of the workman's basket and into the driving station of the vehicle to advance the vehicle to the next desired work location.

The lifting equipment herein described is particularly advanageous because of the unique means utilized for rotating the boom structure about the vertical axis. In the lifting equipment shown in the drawing, it has been possible to utilize a substantially conventional vehicle with a van-type body in which the circular track structure 37 is carried by the roof or top of the van-like body. The bearing assembly 31 serves to carry substantial thrust loading as well as axial loading. Such a bearing is relatively simple and eliminates the need for complicated and very large gears. The rotation of the boom structure is accomplished by pneumatic tired wheels 63 and 64 and the associated rollers. Such an arrangement is particularly advantageous because the circular track structure 37 and the rollers and wheels need not necessarily have fine tolerances and thereby they eliminate the need for expensive machining and the like.

Although the rubber tired wheels 63 and 64 have been shown as being mounted in the plate assembly 36, if desired they can be mounted so that they are spring loaded into engagement with the rollers engaging the circular track structure 37. Such means generally is not actually necessary because greater loads on the boom structure 66 will normally urge the wheels 63 and 64 into more intimate contact with the rollers. Thus, the weight of the boom itself applies additional driving force between the rubber tired wheels 63 and 64 and the rollers as would any additional load on the boom structure.

The frictional type rotational drive provided for the lifting equipment herein described is also advantageous in that it is practically unbreakable. This is true because if any undue sidewise loading is applied to the boom structure, slippage will occur between the rollers and the circular track structure and, for this reason, the boom structure 66 cannot be accidentally destroyed in the event a sidewise loading is accidentally placed upon the boom structure 66. It is readily apparent that the force required for slippage between the rollers and the circular track structure can be easily adjusted by adjustment of the forces yieldably urging the rollers into engagement with the circular track structure.

The rotational drive provided for the lifting equipment, as shown in FIGURES 1–4, is also advantageous in that it makes it relatively easy to provide insulation between the outer or main boom section 67 and the vehicle 11. This is accomplished by the use of the rubber tired wheels 63 and 64 and the outer rubber rollers engaging the circular track structure. Thus, the insulated inner boom section 68 can protect against relatively high voltages which may be encountered by the workman's basket 83, whereas the outer boom section, which often is formed of metal, may protect the workman or pedestrian who might accidentally come in contact with the vehicle 11 when the outer or main boom section is in contact with a secondary voltage as, for example, a voltage ranging from 110 volts to 600 volts. The rubber mounting provided for the bearing 31 insulates the entire litfing apparatus from the vehicle.

An additional advantage of the rotational drive means is that the use of the rubber tired wheels 66 and 64 which engage the smaller rollers to provide a speed reduction which, in turn, reduces the speed reducing requirement of the gear motor 51.

Although the lifting apparatus 26 has been described in conjunction with a telescoping boom structure 61, it is readily apparent that, if desired, an articulated or elbow-type boom structure can be utilized while still obtaining all of the advantages of the present invention. The present invention would provide relatively simple means to serve as the means for rotating the boom structure about a vertical axis.

An alternative construction for the construction shown in FIGURE 2 is shown in FIGURE 2A. In this alternative construction, the mounting plate 29 is secured to the upper side of a ceramic insulator 87 by cap screws 88 threaded into inserts 89 provided in the insulator 87. The lower side of the insulator 87 is secured by cap screws 88 to a self-aligning ball bearing assembly 90 which is mounted upon a flanged stationary hub 91 secured to the frame 14 by cap screws 92. The flanged hub 91 is provided with a centrally disposed opening 93 and the mounting plate 29 is provided with an opening 94 to permit the power or hydraulic lines to be connected to the drive mechanisms utilized for operating the lifting apparatus.

The operation of this embodiment is substantially identical to that hereinbefore described. The principal difference is that the insulation is provided by the ceramic insulator 87 rather than the resilient insulating member 32.

Figure 6:
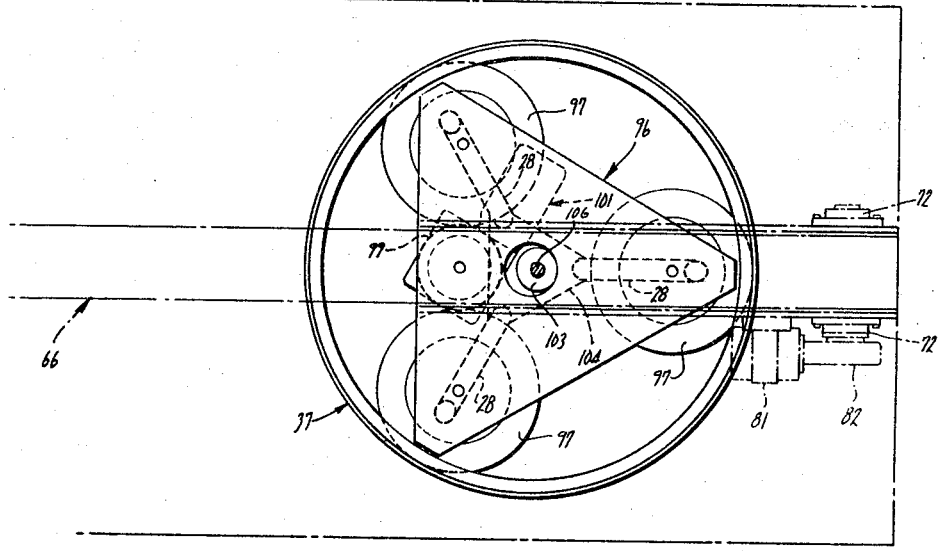
FIGURE 6 is a cross-sectional view taken along the line 6—6 of FIGURE 5.
Figure 5:
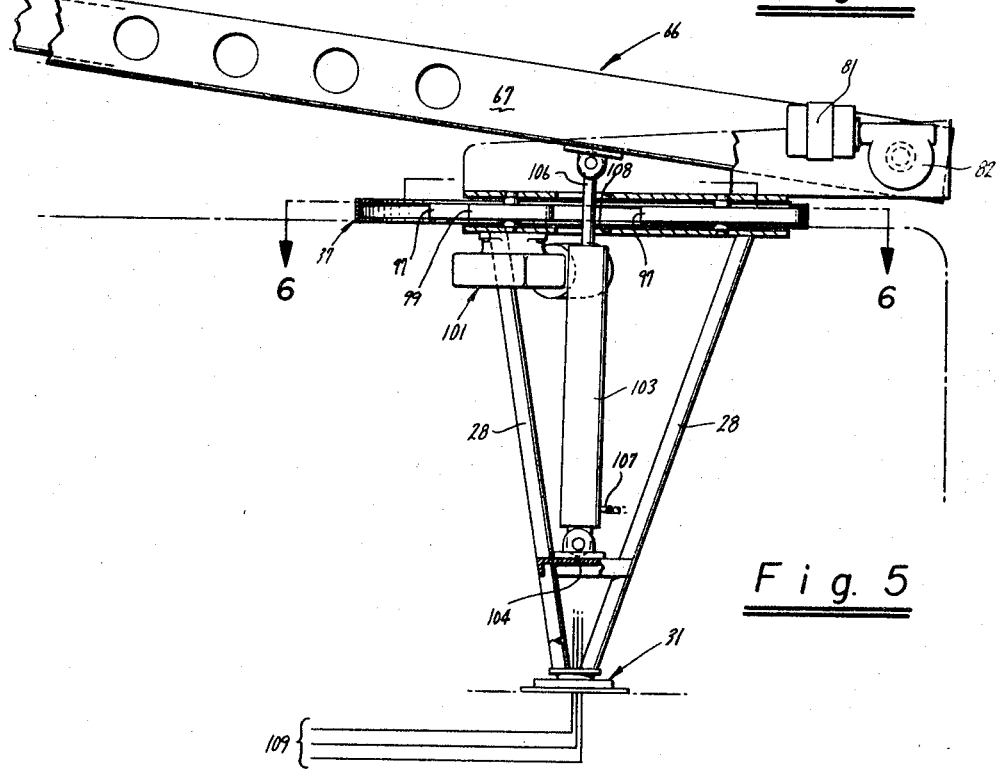
FIGURE 5 is a side elevational view, partially in cross-section, of another embodiment of the lifting equipment incorporating the present invention.

Another embodiment of the lifting equipment is shown in FIGURES 5 and 6. As shown therein, the lifting equipment consists of a triangular plate assembly 96 which carries three pneumatic rubber tired wheels 97 on its apexes. The rubber tired wheels 97 are mounted upon shafts 98 rotatably mounted in the plate assembly 96. Means is provided for driving at least two of the wheels 97 and consists of a drive wheel 99 which frictionally engages the outer surfaces of the wheels 97. The drive wheel 99 is driven by a gear motor 101 mounted upon the plate assembly 96.

Fluid actuated means is provided for raising and lowering the boom structure 66 about the horizontal axis formed by the pin 71 and consists of a cylinder 103 which is pivotally mounted upon a plate 104 carried upon the support members 28. A piston (not shown) is mounted within the cylinder 103 and is connected to a piston rod 106 which is pivotally connected to the outer boom section 67 as shown in FIGURE 5. The cylinder 103 is provided with a fitting 107 which is adapted to be supplied with fluid under pressure from a suitable source (not shown) as, for example, a hydraulic pump driven by the engine of the vehicle 11. As can be seen, the rod 106 extends through openings 108 provided in the plate assembly 96. The control wires and the power wires for the gear motor 101 can be supplied through the center of the bearing 31, as illustrated schematically by the wires 109 in FIGURE 5.

The operation of this embodiment of my invention is substantially identical to that hereinbefore described. However, instead of being a completely electrical unit, as shown in FIGURES 1–4, the embodiment of the invention shown in FIGURES 4, 5 and 6 is a combination of electric and hydraulic fluid actuated units. By this, electrical and hydraulic controls must be provided in a workman's platform. In all respects, the motor operation would be identical to that hereinbefore described. In this embodiment, the rubber tired wheels directly contact the track structure 37. This may be advantageous in that it provides greater frictional engagement between the track structure and the wheel-like members. In addition, the pneumatic tires 97 can accommodate greater irregularities in the track structure 37 if that be necessary.

Figure 7:
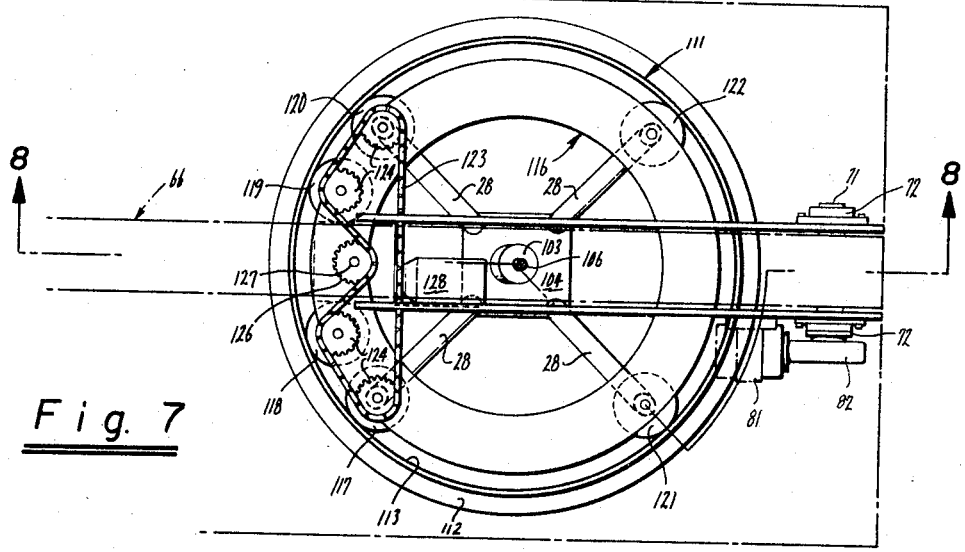
FIGURE 7 is a side elevational view, partially in cross-section, of another embodiment of a lifting equipment incorporating the present invention.
Figure 8:
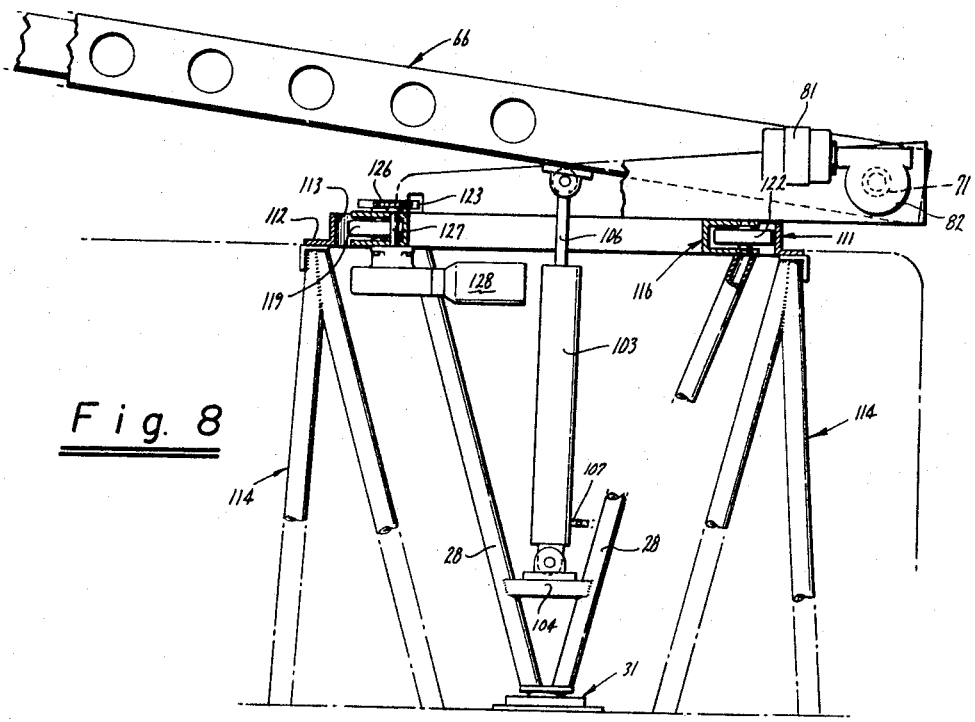
FIGURE 8 is a cross-sectional view taken along the line 8—8 of FIGURE 7.

Still another embodiment of the invention is shown in FIGURES 7 and 8. In this embodiment, a slightly different circular track structure 111 has been utilized. As can be seen from FIGURE 7, this circular track structure consists of an angular member 112 which is substantially L-shaped in section to provide an inner annular surface 113. The member 112 is supported by a framework 114. In place of the structure 36, a circular member 116 which is substantially U-shaped in cross-section is provided. First and second sets of the driving rollers are mounted in the member 116 and consists of rollers 117, 118, 119 and 120. Idler rollers 121 and 122 are also mounted in the member 116. The rollers 121, 122, 117 and 120 are yieldably urged into engagement with the circular track structure by spring means (not shown). Means is provided for driving the rollers 117–120 and consists of a chain 123 which drives the sprockets 124 secured to each of the rollers 117–120. Means is provided for driving the chain 123 and consists of a sprocket 126 mounted upon the output shaft 127 of a gear motor 128 mounted upon the U-shaped member 116.

Means for extending and retracting the boom structure 66 is the same as that hereinbefore described. The same is true of the means for raising and lowering the boom structure about the horizontal axis formed by the pin 71.

Use and operation of the apparatus shown in FIGURES 7 and 8 is substantially identical to that hereinbefore described. The principal difference is that the rollers are driven directly by a chain drive.

Figure 9:
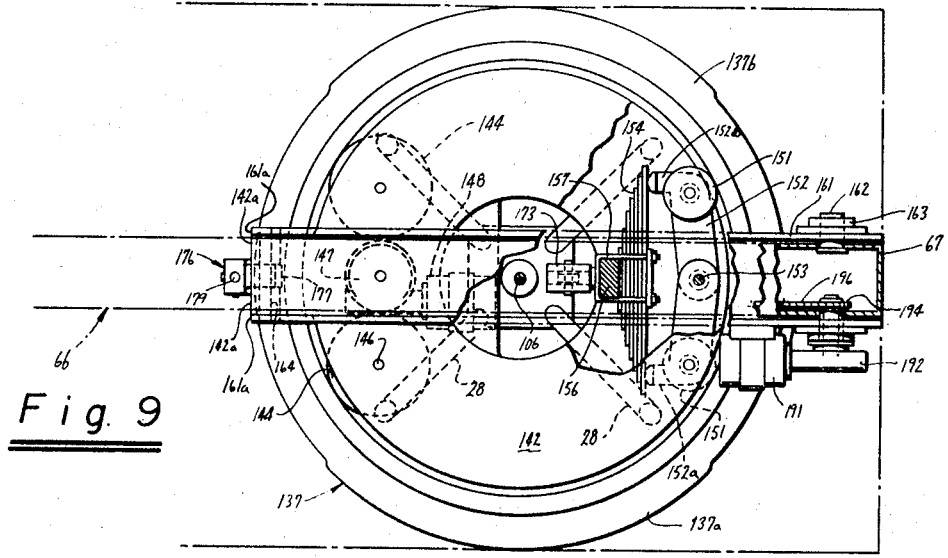
FIGURE 9 is a top plan view of another embodiment of a lifting equipment incorporating the present invention.
Figure 10:
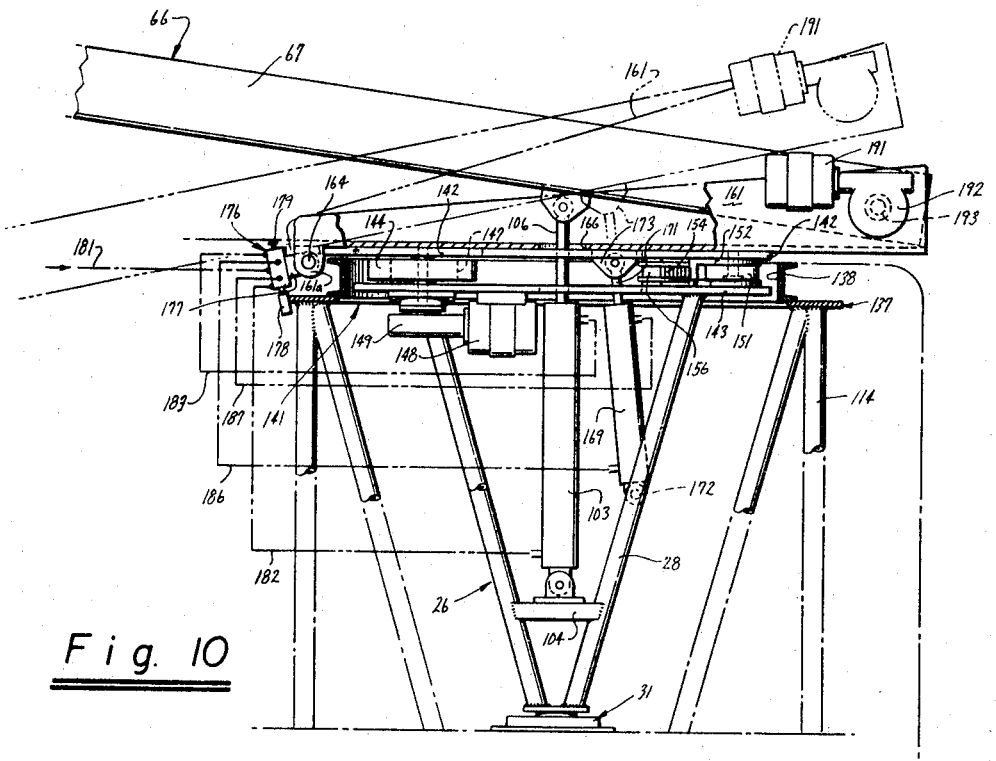
FIGURE 10 is a side elevational view of a portion of the lifting equipment shown in FIGURE 9.

In the embodiment shown in FIGURES 1–8, it is not possible to lower the workman's platform or basket 83 to the ground. In certain types of equipment, this may be desirable. This is possible in the embodiments shown in FIGURES 9–14. In the embodiments shown in FIGURES 9 and 10, it can be seen that many of the parts of the lifting equipment shown in FIGURES 9 and 10 are substantially identical to those hereinbefore described. For convenience in illustration, the mobile platform consisting of the wheeled vehicle 11 has been omitted. A circular track structure 136 is mounted upon the framework 114 and consists of a circular plate 137 which is affixed to the top of the frame members 114 by suitable means such as welding. A circular track member 138 is affixed to the circular plate 137 and is generally U-shaped in cross-section with the legs of the track member 138 facing outwardly. The circular plate 137 is provided with cam portions 137a and 137b disposed on opposite sides of the plate and generally on the sides of the vehicle on which the lifting equipment is mounted for a purpose hereinafter described.

The lifting equipment 26 includes a plate assembly 141 which includes upper and lower plates 142 and 143, respectively. The lower plate 143 is secured to the upper ends of the support members 28. A pair of wheels 144 are carried between the upper and lower plates 142 and 143 by shafts 146 rotatably mounted in the plates 142 and 143. It will be noted that the wheels 144 are spaced apart and are separated by less than 120°. The wheels 144 are driven by a wheel 147 which frictionally engages the same. The wheel 147 is driven by suitable motive means such as a hydraulic motor 148 which drives a speed reducing assembly 149. Both the motor 148 and the speed reducing assembly 149 are secured to the lower plate 143.

A pair of additional wheels 151 form a part of the plate assembly 141. The wheels 151 are rotatably mounted upon links 152 which are pivotally connected to the upper and lower plates 142 and 143 by a pin 153. The wheels 151 are also spaced apart a distance less than 120°. Means is provided for yieldably urging the wheels 151 into engagement with the circular track member 138 and consists of a leaf spring assembly 154 which has its opposite ends engaging extenison 152a provided on the links 152 and has an intermediate portion clamped to a bar 156 by a U-bolt assembly 157. The yieldable means in the form of a leaf spring assembly 154 serves to ensure that the wheels 151 and the wheels 154 always frictionally engage the circular track structure 136 to ensure that the plate assembly 141 with the boom structure mounted thereon will be rotated about the vertical axis whenever the motor 148 is actuated.

As hereinbefore described, the lifting apparatus also includes a boom structure 66. The outer or main section 67 of the boom structure is pivotally mounted upon one end of a U-shaped support member 161 by means of hollow tubes or trunnions 162 which are affixed to the outer boom section 67 and are rotatably mounted upon bearings 163. The U-shaped support member 161 is provided with a pair of spaced downwardly depending ears 161a which are pivotally mounted upon a pin 164 carried by an extension 142a of the upper plate 142. The piston rod 106 of the fluid cylinder 103 is secured to the outer boom section 67 and extends through a hole 166 provided in the U-shaped support 161.

Means is provided for moving the U-shaped support 161 about the pivot point formed by the pin 164 and carrying with it the boom structure 66 in the form of an actuator 166 which consists of a cylinder 169, a piston (not shown) within the cylinder and a piston rod 171. The cylinder 169 is pivotally connected to a bracket 172 secured to the support members 28, whereas the upper end of the piston rod 171 is pivotally connected to a bracket 173 affixed to the lower portion of the outer boom section 67. The flow of fluid to and from the cylinder 169 and the cylinder 103 is controlled by a control valve 176 which is provided with an arm 177 pivotally mounted upon the pin 164. The control valve 176 is also provided with a cam follower 178 which is adapted to engage the cam portions 137a and 137b provided on the plate 137 and a plunger 179 which is adapted to be engaged by the outer boom section 67 as hereinafter described.

Means is provided for supplying fluid to the control valve 176 which controls the flow of fluid to the cylinders 103 and 169 and consists of piping 181 which is connected to a suitable source of fluid under pressure (not shown). The control valve 176 is provided with means which normally retains the plunger 179 in a raised position. In the raised postion of the plunger 179, fluid is supplied by the control valve 176 to piping 182 which is connected to the lower portion of the cylinder 103. Piping 183 connects the upper end of the cylinder 103 to the control valve 176. When the plunger 179 is depressed, fluid is supplied from the piping 181 to piping 186 which is connected to the lower end of cylinder 169. The upper end of the cylinder 169 is connected by piping 187 to the control valve 176.

In order to make the complete lifting equipment hydraulically operated, the means for extending and retracting the boom structure 66 consists of a combination hydraulically operated motor and brake mechanism which drives a worm (not shown) which drives a worm gear (not shown) mounted in a housing 192. The worm gear drives a shaft 193 mounted in a trunnion 162 for the boom structure 66 and drives a sprocket 194 which drives a chain 196 which is used for extending and retracting the boom structure.

Operation of the embodiment of the present invention shown in FIGURE 10 is very similar to that hereinbefore described with respect to the other embodiments. In the present embodiment, all the actuating devices are in the form of hydraulic actuating devices rather than electrically operated devices. To rotate the boom structure about a vertical axis, the motor 148 is operated. To extend and retract the boom structure, the motor 191 is operated; and to raise and lower the boom structure about a horizontal axis, the cylinder 103 is filled and emptied.

It should be noted that the loading of the boom structure 66 on the plate assembly 141 is such so that as the load is increased on the boom structure, the greater the pressure that is applied to the rollers 144 to increase the frictional forces between the circular track structure and the rollers 144. Thus, the greater the load on the boom structure, the greater the frictional engagement with the circular track structure 136.

Let it be assumed that it is desired to lower the workman's platform or basket carried by the outer end of the boom structure 66 to the ground. When such is the case, the boom structure 66 must be rotated about the vertical axis until the cam follower 178 engages the cam tracks 137a and 137b. When this is the case, the control valve 176 is raised to a position in which it extends in a substantially vertical direction. The plunger 179 in this position is adapted to be engaged by the boom structure 66. When this is the case, the fluid, instead of being supplied to the cylinder 103, is supplied to the cylinder 169. Thus, when it is desired to lower the workman's platform to the ground, fluid is supplied through the piping 181, through the control valvve 176, to the lower extremity of the cylinder 169 to raise the U-shaped support member 161 and the boom structure 66 carried thereby until the boom structure 66 has attained a position similar to the broken lines shown in FIGURE 10.

It will be noted that the control for making this possible would have to be operated in the opposite manner than would be the case if the fluid were supplied to the cylinder 103. In other words, when fluid is supplied to the bottom of the cylinder 103, the outer extremity of the boom section is raised, whereas when the actuator 166 is being operated, supplying fluid to the lower extremity of the cylinder 169 causes the outer extremity of the boom structure to be lowered to a position in which it is inclined below the horizontal. This is accomplished because the piston rod 171 is connected to the U-shaped support 161 to raise the U-shaped support about the pivot point formed by the pin 164. The boom structure can be readily positioned so that the workman's basket carried by the outer end reaches the ground as shown by the broken line position of the boom structure 66 in FIGURE 10. The operator may then enter the workman's basket and by utilizing the controls in the workman's basket, raise himself above the ground by reversing the flow of fluid so that fluid is supplied to the upper end of the cylinder 169 to bring the U-shaped support member 161 back to a horizontal position. Then, if the workman still wishes to raise himself still further, it is necessary for the workman to rotate the boom structure together with the plate assembly 141 by operating the motor 148 to rotate the same until the cam follower 178 is out of engagement with the cam portions 137a and 137b to permit the control valve 176 to swing downwardly away from the boom structure so that the plunger 179 is no longer actuated by the boom structure. When this is the case, the plunger 179 is returned to its normal position in which fluid is supplied to the cylinder 103. The entire lifting equipment may then be operated in a manner similar to that hereinbefore described.

From the foregoing arrangement, it can be seen that the actuator 168 is only brought into play when two conditions occur. One, the boom structure 66 must be in a substantially horizontal position within the U-shaped support 161; and, second, the control valve 176 must have its cam follower 178 in engagement with either of the cam portions 137a and 137b.

It will be noted that the portions 137a and 137b have been positioned so that the workman's basket carried by the boom structure can only be lowered to the ground on the sides of the vehicle. It should be appreciated that, if desired, the positions of these cam portions can be readily shifted to any part of the 360° of rotation. The arrangement shown in FIGURE 9 is particularly advantageous in that it prevents the operator from lowering the workman's basket below the horizontal when the boom structure 66 is in a position overlying the cab of the vehicle. It will also be noted that the operation of the apparatus is automatic when the boom structure is moved to a certain angular position, that is, in these predetermined angular positions, the boom structure can be positioned so that the workman's basket can be lowered to the ground.

Figure 11:
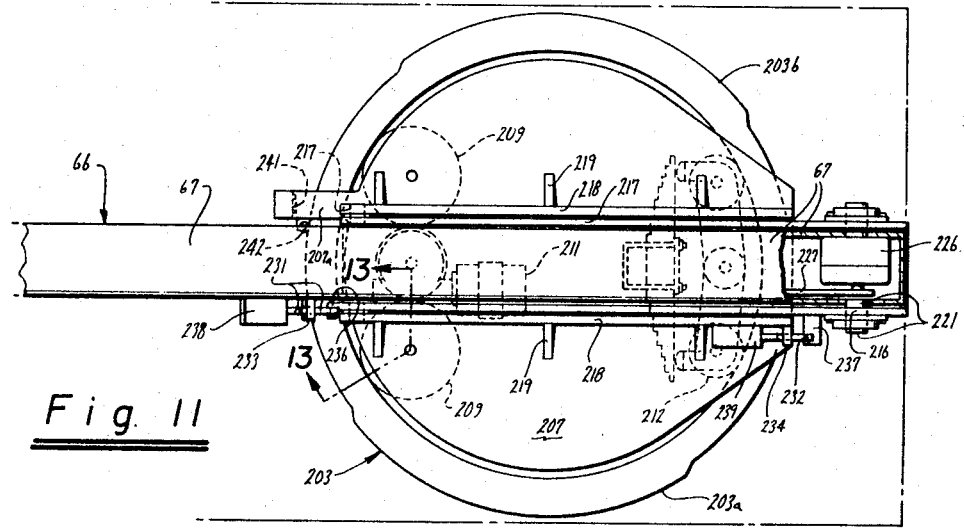
FIGURE 11 is a top plan view of another embodiment of a lifting equipment incorporating the present invention.
Figure 12:
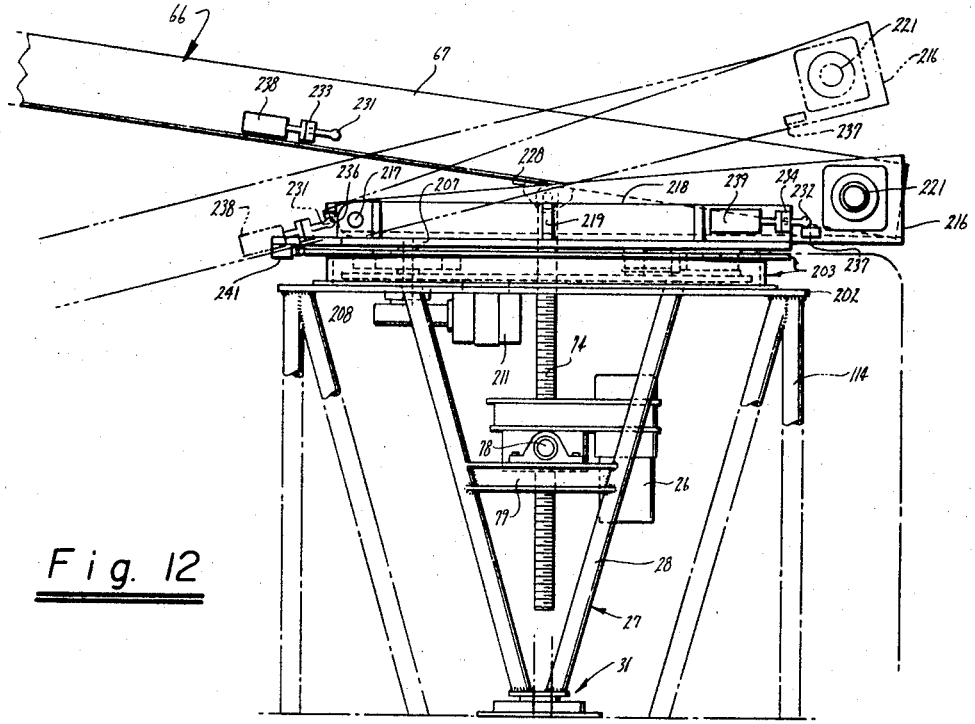
FIGURE 12 is a side elevational view of the portion of the lifting equipment shown in FIGURE 11.

Another embodiment of the lifting equipment is shown in FIGURES 11 and 12. It is generally of the electrically operated type. Again, its construction is in many respects very similar to the embodiments hereinbefore described. It includes a circular track structure 201 which is mounted upon the framework 114. The circular track structure includes a plate 202 mounted upon the framework 114 and a circular track member 203 mounted upon the plate 202. A plate assembly 206 similar to the plate assemblies hereinbefore described is mounted within the track structure and includes an upper plate 207 and a lower plate 208 which carry wheels 209 which are rotatably mounted between the plates and which are driven by a motor 211 in a manner similar to the manner in which the wheels 144 are driven in the embodiment shown in FIGURES 9 and 10. Similarly, wheels 212 are mounted between the plates 207 and 208 and are yieldably urged into engagement with the circular track member 203. A U-shaped support member 216 is provided and is pivotally mounted by means of pins 217 and another U-shaped support member 218 affixed to the top plate 207. Suitable braces 219 are provided for the U-shaped member 218. As can be seen from FIGURES 11 and 12, the U-shaped support member 216 is adapted to nest within the U-shaped member 218. The boom structure 66 is provided with trunnions 221 which are affixed thereto and are rotatably mounted in bearings 222 provided on the rear portion of the U-shaped support member 216.

Means is provided for extending and retracting the boom structure 66 and consists of a combination motor and brake 226 mounted within the boom structure and which drives the chain 227 for extending and retracting the boom structure. Means of the type hereinbefore described and consisting of a motor 26 and a screw 74 is provided for raising and lowering the boom structure about the horizontal axis. As can be been in FIGURE 12, the screw 74 is pivotally secured to a bracket 228 which is secured to the bottom of the U-shaped support member 216.

Means is provided for preventing the boom structure 66 from being raised out of the U-shaped member 216 and for preventing the U-shaped member 216 from being raised out of the U-shaped member 218. This means consists of a pair of latches 231 and 232. The latch 231 is slidably mounted in a bracket 233 provided on the outer boom section 67 and the latch 232 is slidably mounted in a bracket 234 secured to the outer U-shaped support member 218. The latch 231 is adapted to be disposed in a recess 236 formed in the U-shaped support member 216, whereas the latch 232 is adapted to overlie a block 237 mounted on the U-shaped support member 216. The latches 231 and 232 can be manually operated; however, if desired and as shown in the drawings, electrically operated solenoids 238 and 239 can be provided for moving the latches 231 and 232 between engaging and disengaging positions.

A microswitch 241 is provided which is mounted on an ear 207a of the plate 207. The microswitch 241 is provided with an operating arm 242 which is adapted to engage cam portions 203a and 203b provided on the track member 203.

Operation of this embodiment of our invention is also very similar to that hereinbefore described. In normal operation, the latch 231 is in a position in which it does not enter the recess 236, whereas the latch 232 is normally in a position in which it overlies the block 237. When this is the case, the lifting equipment operates in a manner substantially identical to the lifting equipments hereinbefore described in FIGURES 1–8. In other words, rotation about a vertical axis is accomplished by operating the motor 11. Extension and retraction of the boom structure is accomplished by operating the motor 226 and raising and lowering of the boom structure about a horizontal axis is accomplished by operating the motor 26.

When it is desired to lower the boom structure and the workman's basket carried by the end of the boom structure below the horizontal position so that the workman's basket can rest upon the ground, control means (not shown) is actuated to deenergize the solenoid 238 connected to the latch 231 and to energize the solenoid 239 connected to the latch 232. When the latch 231 is in engagement with the recess 236 and the latch 234 is out of engagement with the block 237, operation of the motor 26 will cause the support member 216 to be raised and pivoted about the hinge pins 217 to cause the outer end of the boom structure with the basket or platform attached thereto to be lowered to ground level as shown in the broken lines in FIGURE 12. The operator can then step in the workman's basket from the ground and then cause the boom structure to be raised until it is in a horizontal position. The solenoids can then be operated so that the latch 232 overlies the block 237 and so that the latch 231 is free of the recess 236. The lifting equipment may then be operated in a conventional manner as hereinbefore described.

Although the wheels 209 of the embodiment of the lifting equipment shown in FIGURES 11 and 12 can be constructed in any suitable manner, there is shown a cross-sectional view in FIGURE 13 which has particularly desirable insulating features. As shown in FIGURE 13, such a wheel is provided with a flanged hub 246 which is mounted by roller bearing assemblies 247 upon a large bolt 248 which extends through the plates 207 and 208. The hub 246 is positioned between the plates 207 and 208 by spacers 249 mounted upon the bolt 248. A ceramic insulator 251 is mounted in the flanged hub 246 and carries a rim 252. A pneumatic tire 253 of suitable insulating material such as rubber is carried by the rim 252. If desired, the tire 253 can be formed of a suitable solid insulating material such as rubber. As can be seen, the tire 253 is adapted to frictionally engage the circular track structure and namely, the track member 203.

The principal advantage of the construction shown in FIGURE 13 is that it makes possible the use of ceramic insulator which forms an excellent insulation to supplement the insulation provided by the rubber tire.

The apparatus disclosed for the lifting equipment in FIGURES 11 and 12 is advantageous because it does not require the use of an additional actuator as was required in the embodiment shown in FIGURES 9 and 10 in the form of the actuator 168. By utilizing the latches 231 and 232, it is possible to cause the means conventionally used for raising and lowering the boom structure to also perform the additional function of lowering the boom structure to a position below the horizontal.

Still another embodiment of the lifting equipment is shown in FIGURE 14. This particular embodiment is adapted for the stringing of telephone cable and messenger as well as other operations. In this embodiment, the circular track structure 261 is carried upon a rigid framework 262 mounted upon the platform 16 of a vehicle 11. The framework 262 consists of vertical standards 263 and diagonal braces 264 which are secured between the platform 16 and the circular track structure 261. It will be noted that the framework 262 is positioned on the left-hand side of the vehicle as the vehicle is viewed from the rear to provide some space on the right-hand side of the platform 16 accommodates the cable, messenger and the like which may be passed over the platform as, for example, when the lifting equipment is utilized for prelashing operations. The lifting equipment shown in FIGURE 14 also includes a plate assembly very similar to that hereinbefore described and includes a top plate (not shown) upon which large gussets or plates 266 are mounted. The circular track structure also includes a rotatably mounted support structure 27 and the cylinder 103 which is secured to the boom structure 66. The rear extremity of the boom structure 66 is pivotally mounted on trunnions 267 which are secured to the upper extremity of the gussets 266. A combination brake and motor 268 of the type hereinbefore described is mounted upon the boom structure 66 for extending and retracting the same. The cylinder 103 includes means for raising and lowering the boom structure about a horizontal axis. A combination motor and brake 269 is provided for rotating the boom structure 66 with its gussets 266 and the plate assembly about a vertical axis.

The operation of this embodiment of the lifting equipment is also substantially identical to that hereinbefore described. The principal difference is that by providing the large gussets 266 it is possible to raise the pivot point for the boom structure 66 substantially above the circular track structure 261 to thereby permit the boom structure 66 to be lowered to an angle below the horizontal and to thereby permit the workman's platform or basket 83 to be positioned on the ground as shown in FIGURE 14. The principal disadvantage of the embodiment of the lifting equipment shown in FIGURE 14 is that the large gussets 266 require additional clearance for the vehicle when the boom structure 66 is stored in its out-of-the-way position.

Figure 17:
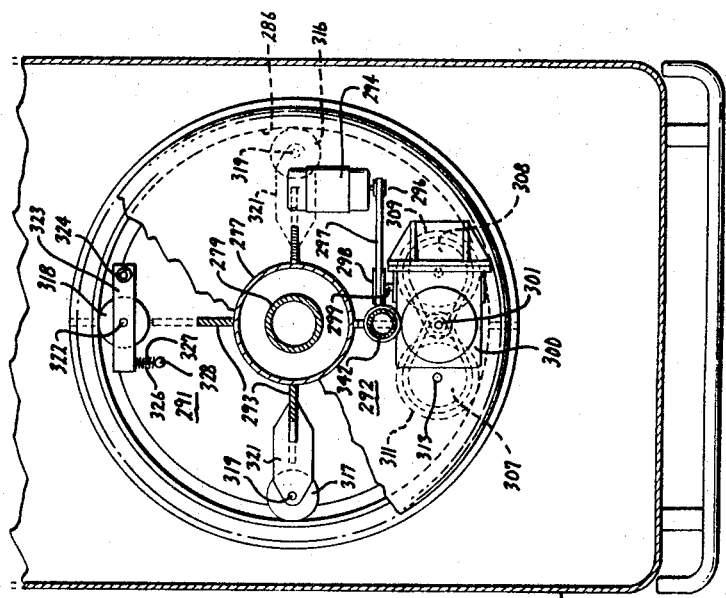
FIGURE 17 is a cross-sectional view taken along the line 17—17 of FIGURE 16.
Figure 16:
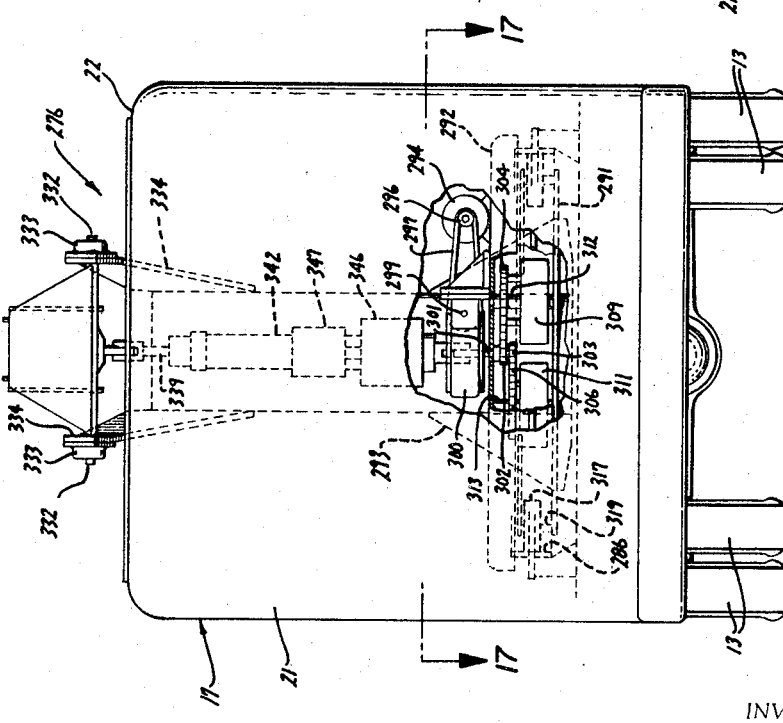
FIGURE 16 is a rear elevational view of the lifting equipment shown in FIGURE 15 with certain portions broken away.

Lifting apparatus 276 is mounted on the self-propelled vehicle 11 shown in FIGURES 15, 16 and 17 of the drawings. The self-propelled vehicle is similar to that hereinbefore described in conjunction with the embodiment shown in FIGURE 1–4. The lifting apparatus consists of a support structure 277 which is in the form of a hollow cylinder and which has its top end closed by an end plate 278 formed integral therewith. A vertical post 279 is securely affixed to the framework 14 (not shown) of the vehicle and extends upwardly through the platform 16. Means is provided for rotatably mounting the support structure 277 upon the post 279 and consists of a self-aligning thrust bearing assembly 281 which is secured to the end plate 278 and mounted upon the top of the post 279. The length of the cylindrical support structure 77 is such so that it is spaced slightly above the platform 16 as can be seen particularly in FIGURE 15. It will be noted that the upper end of the support structure 277 is adjacent the top wall 22 of the van-like enclosure.

Means is provided for causing rotation of the support structure 277 on the post 279 and consists of a framework 282 which generally encircles the support structure 277. The framework 282 is mounted in a fixed position with respect to the platform 16 and is mounted thereon. As can be seen particularly from FIGURE 5, the framework 282 consists of a circular non-rotatable member 283 which is substantially T-shaped in cross-section and which is secured to the platform 16 by a plurality of supports 284. The member 283 is provided with an inwardly facing circular drive surface 286 which is disposed in a vertical plane concentric with the support structure 277 and post 279. The circular drive surface 286 has a diameter which is substantially greater than the support structure.

Drive means is carried by the support structure 277 and engages the circular drive surface. This drive means consists of a bottom plate 291 and a top plate 292, both of which are generally parallel to the platform 16. The plates 291 and 292 are mounted upon the support structure 277 by four spaced gussets 293 secured to the cylindrical support structure 277 and to the top and bottom plates 291 and 292 by suitable means such as welding. The gussets 293 are spaced 90° apart as can be seen particularly from FIGURE 17. The top plate 292 has a diameter which is greater than the bottom plate 291 and, in addition, has a downwardly turned outer annular portion 292a.

An electric drive motor 294 is mounted on the top plate 292 and drives a pulley 296. The pulley 296 drives a belt 297 which drives a pulley 298 mounted on the input shaft 299 of a right-angle gear box 300. The gear box 300 is provided with an output shaft 301 which has a pair of sprockets 302 and 303 mounted thereon. The sprockets 302 and 303 drive chains 304 and 306. The chains 304 and 306 drive large sprockets 307 and 308 mounted directly upon the hubs (not shown) of rubber-tired wheel-like members 309 and 311. The rubber-tired wheel-like members are rotatably mounted upon shafts 312 and 313 mounted between the bottom plate 291 and the top plate 292. As can be seen particularly from FIGURE 17, the wheel-like members 309 and 311 are positioned so that their surfaces are adapted to frictionally engage the circular drive surface 286 provided on framework 282.

A plurality of additional wheel-like members 316, 317 and 318 are provided which are adapted to engage the circular drive surface 286. The wheel-like members 316 and 317 are rotatably mounted upon shafts 319 having their lower extremities mounted in the bottom plate 291 and having their upper extremities carried by additional plates 321 that are secured to the gussets 293. As can be seen from FIGURE 17, the wheel-like members 316 and 317 are spaced approximately 90° from a point which is equidistant between the two wheel-like members 309 and 311. The wheel-like member 318 is spaced approximately 180° from the point intermediate the wheel-like members 309 and 311 and is disposed opposite the same. The wheel-like member 318 is carried by a shaft 322 mounted in a pair of spaced parallel plates 323. The plates 323 are pivotally mounted upon a pin 324 carried by the bottom plate 291 and the top plate 292. Means is provided for yieldably urging the wheel-like member 318 into frictional engagement with the circular drive surface 286 and consists of a compression spring 326 which is slidably mounted on a rod 327 carried by a post 328. The spring 326 yieldably urges the plates 323 in a direction so that the wheel-like member 318 is urged into engagement with the circular drive surface 286.

In this embodiment of the invention, it can be seen that the means for providing rotational movement for the support structure is disposed in relatively close proximity to the platform 16 with the non-rotatable circular drive surface 286 also being disposed adjacent the platform 16.

The lifting apparatus 276, as in the previous embodiments, also includes a boom structure 66 having a main or outer section 67 and a telescoping inner section 68. The outer boom section 67 is provided with a reinforced rear section 331 which carries a pair of shafts 332 which are rotatably mounted in bearings 333. The bearings 333 are mounted upon the rear extremities of the pair of spaced support plates 334 mounted upon the sides of the upper extremities of the cylindrical support structure 277 and extending upwardly and rearwardly through an opening 336 provided in the top wall 22 of the van-like enclosure. The opening 336 is formed in such a manner so that the support structure 277 with the support plates 334 carried thereby can be rotated through 360°.

Means is provided for raising and lowering the outer end of the boom structure 66 about the horizontal axis formed by the shafts 332 and consists of an actuator 338 of which the piston rod 339 is connected by a pin 341 to the lower extremity of the rear section 331 of the outer boom section 67. The cylinder 342 of the actuator 338 is pivotally mounted by a pin 343 upon one of the gussets 293. It can be seen that the actuator 338 is mounted exterior of but adjacent to the cylindrical support structure 277. A hydraulic pump 346 is mounted directly upon the cylinder 242 and is provided for controlling the supply of fluid into and out of the cylinder 342 to operate the piston (not shown). A motor 347 is provided for driving the pump 346.

Means is provided for extending and retracting the inner boom section 68 with respect to the outer boom section 67 and consists of an electric motor 351 which drives a gear box 352. The gear box 352 drives a sprocket (not shown) which drives a chain (also not shown) in the manner described in copending application Ser. No. 521,-193, filed Jan. 17, 1966 and now abandoned.

A workman's or operator's platform 83 is mounted on the outer end of the boom structure 66 and, as shown in previous embodiments, it is pivotally mounted upon a pin 84 carried by the outer end of the inner boom section 68. The pivotal mounting permits the workman's platform 83 to assume a level condition as the boom structure is raised and lowered about the horizontal axis formed by the pivot shaft 332. A control mechanism 86 is mounted within the basket 83 and is provided for controlling the operation of the bottom structure 66.

In order to protect the interior of the enclosure of the van-like body, a large cover plate 356 is secured to the support plates 334 and rotates with the support plates. It can be seen that the cover plate 356 has a diameter which is slightly larger than the diameter of the opening 336 and immediately overlies the top 22. A small opening 357 is provided in the cover plate through which the piston rod 339 extends.

Operation and use of the lifting equipment is very similar to that hereinbefore described. When the motor 294 is operated, the support structure 277 carrying the boom structure 66 is rotated above the vertical axis formed by the post 279. The gear box 299 which is driven by the motor 294 drives both sprockets 307 and 308 which drive both wheel-like members 309 and 311 to cause the support structure 277 to be rotated.

At the same time that the boom structure is being rotated, it can be seen that the outer end of the boom structure can be raised and lowered about the horizontal axis formed by the shafts 332 merely by operating the motor 347. Also, at the same time, the inner boom section 68 can be extended or retracted relative to the outer boom section by operation of the motor 351.

Although the present embodiment has been described with a van-like body, it should be appreciated that this construction is particularly adapted for use on which the vehicle is only provided with a platform and no enclosure. This is particularly true since the supporting framework for the circular drive surface 286 is mounted immediately adjacent the platform 16.

It can be seen that this embodiment of the invention shown in FIGURES 15–17 still retains many of the desirable features of the lifting apparatus hereinbefore described in conjunction with the previous embodiments. For example, increased loading placed on the boom structure 66 increases the force placed on the lever arm formed by the vertical support structure 277 which urges the wheel-like members 309 and 311 toward the circular drive surface 286 with a greater force. This is true because the wheel-like members 309 and 311 are centered with respect to the longitudinal axis of the boom structure.

It is apparent from the foregoing that there has been provided a new and improved lifting equipment which has many advantages. In particular, it is constructed in such a manner that it can be relatively easily fabricated with a minimum of expense. In addition, the particular rotational drive utilized greatly simplifies the construction of the lifting equipment. It also makes it possible to provide additional safety features in the lifting equipment as, for example, it makes it possible to prevent damage to the boom structure by sidewise loading. It also makes it possible to insulate the main boom section from the remainder of the vehicle to protect people coming into contact with the vehicle from being electrocuted in the event the lower outer boom section may accidentally be in contact with a secondary power source.

It is also apparent from the foregoing that the lifting equipment can be constructed so that the boom structure can be positioned to lower the workman's platform to the ground. The lifting equipment also can be constructed so that such operation is substantially automatic or one in which its operation can be accomplished with very little difficulty.

I claim:

1. In a lifting equipment, a platform, a support structure, means rotatably mounting the support structure upon the platform for rotation about a vertical axis, a boom structure mounted on the support structure for movement about a substantially horizontal axis and drive means mounted upon said platform and said support structure for causing rotation of said support structure about said vertical axis, said drive means including a drive structure mounted in a fixed position on the platform, said drive structure having a circular drive surface having a fixed position relative to the platform, and at least three spaced friction members adapted to make contact with said circular drive surface, and motive means for driving at least one of said drive members.

2. A lifting equipment as in claim 1 wherein said one drive member is formed of an insulating material.

3. Apparatus as in claim 1 wherein said means rotatably mounting the support structure upon the platform for rotation about a vertical axis includes means for insulating the support structure from the platform.

4. A lifting equipment as in claim 1 wherein said drive surface is spaced a substantial distance above the platform.

5. In a lifting equipment, a platform, a support structure, means rotatably mounting the support structure upon the platform for rotation about a vertical axis, a boom structure mounted on the support structure for movement about a substantially horizontal axis and drive means mounted upon said platform and said support structure for causing rotation of said support structure about said vertical axis, said drive means including a circular drive surface and at least three spaced friction members having contact with said circular drive surface, and motive means for driving at least one of said friction members, said friction members each consisting of a hub, a ceramic insulator mounted on the hub and a resilient insulating member mounted upon the ceramic insulator and adapted to frictionally engage the circular drive structure.

6. In a lifting equipment, a platform, a support structure, means rotatably mounting the support structure upon the platform for rotation about a vertical axis, a telescoping boom structure mounted on the support structure for movement about a substantially horizontal axis and drive means mounted upon said platform and said support structure for causing rotation of said support structure about said vertical axis, said drive means including a circular drive surface and at least three spaced friction members having contact with said circular driving surface and motive means for driving at least one of said friction members, and means for causing movement of the outer end of the telescoping boom structure to a position substantially below said horizontal axis for the boom structure.

7. A lifting equipment as in claim 1 together with means for yieldably urging said one drive member into contact with said circular driving surface.

8. In a lifting equipment, a platform, a support structure, means rotatably mounting the support structure upon the platform for rotation about a vertical axis, a boom structure mounted on the support structure for movement about a substantially horizontal axis and drive means mounted upon said platform and said support structure for causing rotation of said support structure about said vertical axis, said drive means including a circular drive surface, a framework for mounting said circular drive surface a substantial distance above the platform and at least three spaced members having contact with said circular drive surface, and motive means for driving at least one of said members to cause rotation of the support structure.

9. In a lifting equipment, a self-propelled vehicle having a platform thereon, a support structure, means rotatably mounting the support structure upon the platform for rotation about a vertical axis, a boom structure mounted on said support structure for movement about a substantially horizontal axis and drive means mounted upon said platform and said support structure for causing rotation of said support structure about said vertical axis, said drive means including a stationary circular track structure having a substantially circular drive surface spaced a substantial distance above the platform, at least three wheel-like members, at least one of said wheel-like members engaging said circular drive surface, and motive means for driving said wheel-like member engaging said surface.

10. A lifting quipment as in claim 9 together with a workman's platform mounted on the outer end of the boom structure and control means mounted on the workman's platform whereby an operator on the workman's platform can cause rotation of the outer end of the boom structure about a vertical axis, raising and lowering the same about a horizontal axis and movement of the same toward and away from the vehicle.

11. In a lifting equipment, a self-propelled vehicle having a platform thereon and having a closed van-like body having a roof, a support structure, means rotatably mounting the support structure upon the platform for rotation about a vertical axis, a boom structure mounted on said support structure for movement about a substantially horizontal axis, and drive means mounted upon said platform and said support structure for causing rotation of said support structure about said vertical axis, said drive means including a circular track structure mounted in the vicinity of said roof of said van-like body and having a substantially circular drive surface, at least one wheel-like member engaging said circular track surface and motive means for driving said wheel-like member engaging said surface.

12. Lifting equipment as in claim 11 wherein the means for raising and lowering the boom structure about a horizontal axis includes means extending upwardly through the circular track structure.

13. In a lifting equipment, a self-propelled vehicle having a platform thereon, a support structure, means rotatably mounting said support structure upon the platform for rotation about a vertical axis, a telescoping boom structure mounted on said support structure for movement about a substantially horizontal axis and drive means mounted upon said platform and said support structure for causing rotation of said support structure about said vertical axis, said drive means including a circular track structure having a substantially circular drive surface spaced a substantial distance above the platform, at least three wheel-like members, at least one of said wheel-like members engaging said circular track surface and motive means for driving at least one of said wheel-like members engaging said surface, and means for moving the outer end of the telescoping boom structure below a horizontal plane passing through the horizontal axis for the telescoping boom structure, said last named means including means for raising the horizontal axis for the telescoping boom structure.

14. In a lifting equipment, a self-propelled vehicle having a platform thereon, a support structure, means rotatably mounting the support structure upon the platform for rotation about a vertical axis, a telescoping boom structure, means mounting said boom structure on said support structure for movement about a substantially horizontal axis and drive means mounted upon said platform and said support structure for causing rotation of said support structure about said vertical axis, said drive means including a circular track structure, at least one wheel-like member engaging said circular track structure and motive means for driving said one of said wheel-like members, means for pivotally mounting said means for mounting the support structure for movement about a substantially horizontal axis to permit raising of the horizontal axis for the boom structure, latching means for latching said means for mounting said boom structure in said support structure to prevent raising of the horizontal axis for said boom structure, and means for causing movement of the boom structure about the horizontal axis for the boom structure.

15. Lifting equipment as in claim 14 together with cam controlled means for preventing operation of said latching means except in predetermined zones of rotation about a horizontal axis.

16. In a lifting equipment, a platform, a support structure, means rotatably mounting the support structure upon the platform for rotation about a vertical axis, a boom structure mounted on the support structure for movement about a substantially horizontal axis, said boom structure having an outer end which is movable to a position laterally spaced from the support structure, a framework mounted in a fixed position on said platform and generally encircling said support structure, said framework having a non-rotatable circular drive surface mounted in a fixed position relative to said platform, drive means carried by the support structure and engaging said drive surface, said drive means being in a position which is generally centered with respect to the longitudinal axis of the boom structure and also being in a position so that the weight of the outer end of the boom structure urges the drive means into more intimate contact with the drive surface, motive means for driving said drive member for rotating the support structure, and means for raising and lowering the outer end of the boom structure about the horizontal axis.

17. A lifting equipment as in claim 16 wherein said circular drive surface is formed by an annular member and wherein said drive surface is an inside vertical surface of said annular member.

18. A lifting equipment as in claim 16 wherein said support structure is disposed within the confines of said framework.

19. A lifting equipment as in claim 16 wherein at least a portion of said framework is supported by said platform.

20. A lifting equipment as in claim 1 wherein said drive surface is positioned in relatively close proximity to said platform.

21. A lifting equipment as in claim 20 wherein said means for rotatably mounting the support structure upon the platform includes a post mounted upon the platform, and wherein said support structure is rotatably mounted upon said post.

22. A lifting equipment as in claim 20 wherein said support structure is in the form of an elongate member and wherein said boom structure is mounted on the upper portion of said member and wherein said drive means is carried by the lower extremity of said support structure.

23. In a lifting equipment, a platform, a support structure, means rotatably mounting the support structure upon the platform for rotation about a vertical axis, a boom structure mounted on the support structure for movement about a substantially horizontal axis, said boom structure having an outer end which is movable to a position laterally spaced from the support structure, a framework mounted in a fixed position on said platform and generally encircling said support structure, said framework having a non-rotatable circular drive surface mounted in a fixed position relative to said platform, friction drive means carried by the support structure and engaging said drive surface, said drive means being in a position which is generally centered with respect to the longitudinal axis of the boom structure, motive means for driving said drive means for rotating the support structure, and means for raising and lowering the outer end of the boom structure about the horizontal axis.

24. A lifting equipment as in claim 23 wherein said non-rotatable circular drive surface is spaced a substantial distance above the platform.

25. A lifting equipment as in claim 24 wherein said circular drive surface is in relatively close proximity to said platform.

26. A lifting equipment as in claim 23 wherein said support structure is in the form of an elongate cylindrical member and wherein said means rotatably mounting the support structure includes a post mounted upon the platform and means rotatably mounting the support structure upon the post and wherein said drive means is mounted on the lower portion of said support structure.

27. A lifting equipment as in claim 23 wherein said means for raising and lowering the outer end of the boom structure about the horizontal axis includes actuator means disposed outside of said support structure.

28. A lifting equipment as in claim 23 together with a vehicle, said platform being a part of said vehicle, and wherein said vehicle is provided with a van-like enclosure, said support structure being mounted within said van-like enclosure, said van-like enclosure having an opening through which the boom structure is mounted upon the support structure and means rotating with the boom structure for closing said opening in said van-like body.

References Cited

UNITED STATES PATENTS

| | | | |
|---|---|---|---|
| 326,861 | 9/1885 | Gass | 74—199 |
| 2,222,281 | 11/1940 | Beier | 74—199 |
| 2,598,138 | 5/1952 | Sharp | 74—199 |
| 2,988,163 | 6/1961 | Foley | 182—2 |
| 3,085,648 | 4/1963 | Benedetto | 182—2 |
| 3,191,716 | 6/1965 | Eitel | 182—46 |

REINALDO P. MACHADO, *Primary Examiner.*

U.S. Cl. X.R.

182—2